(No Model.)
J. W. FLEETWOOD.
APPARATUS FOR FILTERING CANE JUICE.
No. 555,855. Patented Mar. 3, 1896.
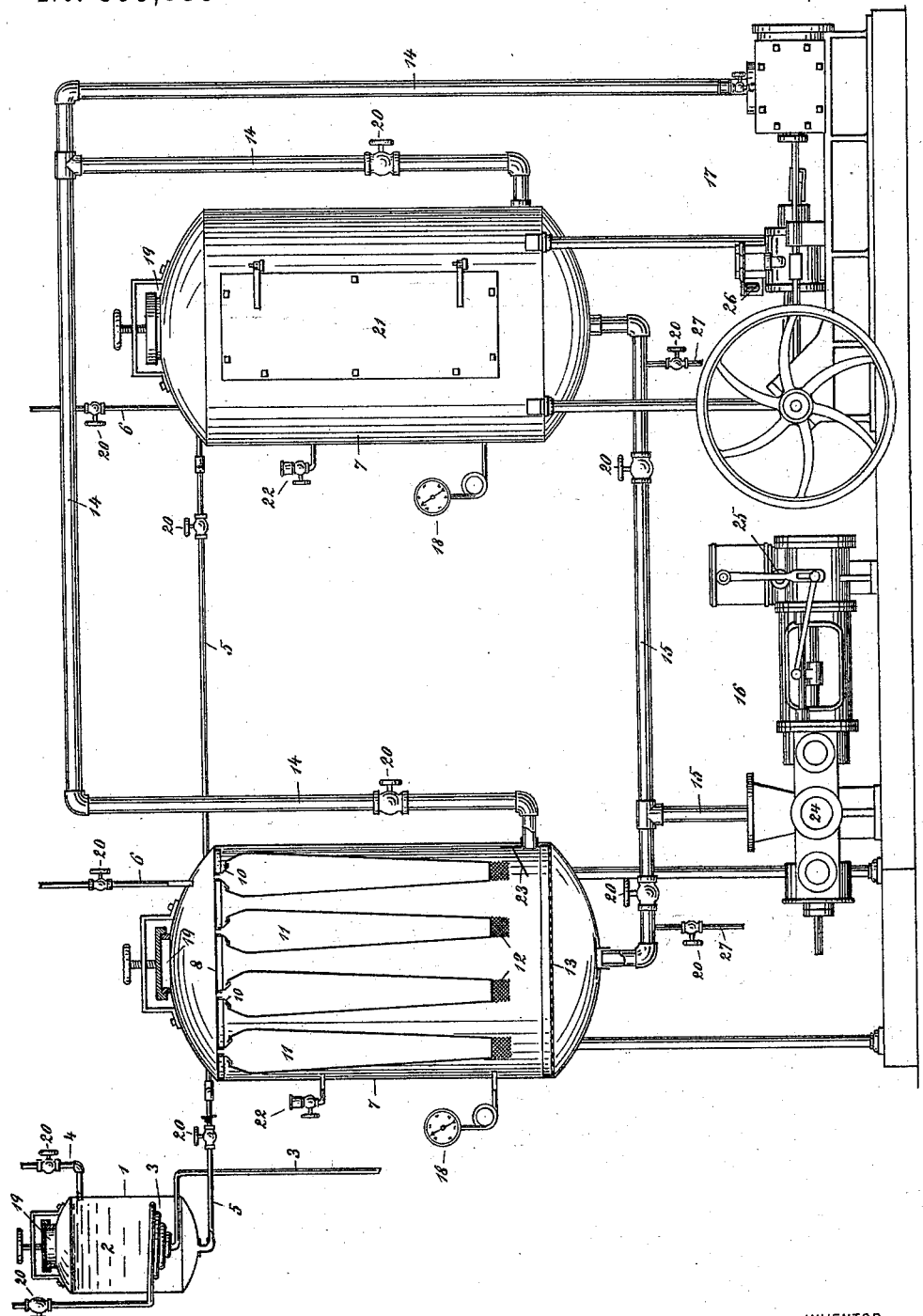
WITNESSES:
Harry Graban
Martin Finnely
INVENTOR
John W. Fleetwood
BY
W. R. Stringfellow
ATTORNEY

UNITED STATES PATENT OFFICE.

JOHN W. FLEETWOOD, OF NEW ORLEANS, LOUISIANA.

APPARATUS FOR FILTERING CANE-JUICE.

SPECIFICATION forming part of Letters Patent No. 555,855, dated March 3, 1896.

Application filed July 25, 1894. Serial No. 518,570. (No model.)

*To all whom it may concern:*

Be it known that I, JOHN WESLEY FLEETWOOD, a citizen of the United States, residing at New Orleans, in the parish of Orleans and State of Louisiana, have invented certain new and useful Improvements in Vacuum-Filters; and I do declare the following to be a full, clear, and exact description of the invention, such as will enable others skilled in the art to which it appertains to make and use the same.

My invention relates to improvements in apparatus for filtering cane-juice, sirup, and the like, and more particularly to that class of filters in which the process of filtration is assisted by means of a vacuum or partial vacuum created in the lower part of the filter-shells.

My invention consists in the novel apparatus hereinafter described and claimed, and will be readily understood by reference to the accompanying drawing, in which similar parts are indicated by similar numerals.

The drawing shows a side elevation of my apparatus, one of the filter-shells being broken away to show its interior.

1 represents a heating-tank into which the sirup or juice to be filtered is admitted through the inlet-pipe 4, and from which it passes out to the filters through the pipe 5.

A steam-pipe 3 enters the tank 1 and is provided with a heating-coil within the said tank for heating the liquid within the said tank, which liquid should be kept at a temperature slightly below the boiling-point.

7 7 are a pair of filter-shells which are supplied with sirup or juice from the heating-tank 1 through the pipes 5. These shells are elevated upon suitable supports, as shown, and each is provided with an opening or manhole 19 in its top, which is normally kept closed and air-tight by means of a cap held securely in position by a set-screw or other suitable device. Within the upper part of the said shells 7 I provide a perforated disk-8, carrying the heads 10 for holding the filter-bags 11 in position. These bags 11 are provided with my filter-bag covers 12 in order to give additional strength thereto.

A perforated disk or strainer 13 is mounted in the lower part of each filter-shell, and the juice from the filter-cloths falls down upon this perforated disk and percolates therethrough to the bottom of the filter-shell 7.

The outlet-pipes 15 connect with the bottom of the two filter-shells and also with the pump 16, which, when the apparatus is in action, draws the liquid downward by its suction and discharges the said liquid in a filtered condition through the discharge-outlet 24 into a suitable receiving-tank. (Not shown.)

25 and 26 represent steam-ports of the pump 16, and 27 represents outlets for the waste.

14 are pipes which open into the filter-shell beneath the filter-cloths and just above the perforated screen 13 and connect with the vacuum-pump 17, by means of which the air is pumped out of the lower part of the filter-shells, thus creating a partial vacuum, and the downward pressure in the filter-shells caused thereby greatly assists and expedites the process of filtration.

A shield or screen 23 is provided over the open end of the pipe 14 into the filter-shell to prevent the sirup or juice from being sucked into the said pipe.

18 is a pressure-gage provided upon each filter-shell for indicating the pressure within the said shell, and 22 is a relief cock or vent.

The various pipes in my apparatus are provided wherever desirable with suitable valves 20, by means of which the connections between the different parts may be regulated or cut off, as may be desired. Thus one filter-shell may be cut out while the other is in operation, and vice versa, without stopping the working of the pumps or the remainder of the apparatus or interfering with its operation.

21 represents a door which is hinged to the filter-shell and adapted to be held in an air-tight position by means of suitable clamping screws or bolts when closed, but may be readily removed for the purpose of cleaning out the filter, inspecting the filter-bags and other interior parts, or for any other reason.

6 represents a washout-pipe for cleaning the interior of the filter-shell.

The operation of the apparatus is as follows: The sirup, juice, or other liquid to be filtered is admitted to the heating-tank 1 through the pipe 4 from the source of supply, and is heated to the proper temperature to thoroughly liquefy the mass by means of the steam-coil within the said tank. From the heating-tank 1 the liquid flows through the pipe 5 which enters the top of the filter-shells, and the juice falls upon the perforated disk 8, passes downward through the filter-bags 11, and drops upon the strainer 13, through which latter it percolates to the bottom of the filter-shell, whence it is drawn off by the pump 16, as hereinbefore described. At the same time the pump 17 is working and the air in the lower part of the filter-shells is being drawn out, creating a partial vacuum, which causes a downward pressure in the said filter-shell, greatly assisting and expediting the process of filtration.

Having thus described my invention, what I claim, and desire to secure by Letters Patent of the United States, is—

1. In a filtering apparatus of the character described, the combination with a heating-tank 1 for receiving and delivering the sirup or juice to the filters; of one or more filter-shells 7 mounted upon suitable supports, and each provided with a perforated disk 8 from the lower side of which are suspended the filter-bags, a strainer 13 beneath said filter-bags; a pipe connecting the bottom of said heating-tank with the upper part of said filter-shells; a pump for drawing the filtered liquid from the bottom of said filter-shells; a pump for exhausting the air from the lower part of said filter-shells; and pipes connecting said pumps with the lower part of said filter-shells, and valves in said pipes for regulating the flow of liquid or air therethrough, substantially as and for the purposes described.

2. In a filtering apparatus of the character described, the combination with a heating-tank 1 for receiving and delivering the sirup or juice to the filters; a steam-pipe entering said tank and provided with a steam-coil therein; of one or more filter-shells 7 mounted upon suitable supports, and each provided with a perforated disk 8 from the lower side of which are suspended the filter-bags, a strainer 13 beneath said filter-bags; a pipe connecting the bottom of said heating-tank with said filter-shells above said perforated disk 8; a pump for drawing the filtered liquid from the bottom of said filter-shells, and discharging said liquid to a suitable receptacle; a pump for exhausting the air from the lower part of said filter-shells; pipes connecting said liquid-pump, and pipes connecting said air-pump with the lower part of said filter-shells; valves in said pipes; and a door provided upon the side of each filter-shell through which the interior of said filter-shell may be inspected, substantially as and for the purposes described.

3. In a filtering apparatus of the character described, the combination with a heating-tank 1 for receiving and delivering the sirup or juice to the filters; a steam-pipe entering said tank and provided with a heating-coil therein; of one or more filter-shells 7 mounted upon suitable supports, and each provided with a perforated disk 8 from the lower side of which are suspended the filter-bags, a strainer 13 beneath said filter-bags; a pipe connecting the bottom of said heating-tank with said filter-shells above said perforated disk 8; a pump for drawing the filtered liquid from the bottom of said filter-shells, and discharging said liquid to a suitable receptacle; a pump for exhausting the air from the lower part of said filter-shells; pipes connecting said pumps with the lower part of said filter-shells, and valves in said pipes; a door for inspecting the interior of said shells; a wash-out-pipe; a gage upon each of said shells for indicating the pressure within said shells; and a relief-cock on each shell for admitting air to said shells, substantially as and for the purposes described.

In testimony whereof I affix my signature in presence of two witnesses.

JOHN W. FLEETWOOD.

Witnesses:
 MARTIN FINNERTY,
 ALPHONSE J. CUNEO.